United States Patent
Xu et al.

(10) Patent No.: US 10,091,106 B2
(45) Date of Patent: Oct. 2, 2018

(54) METHOD FOR IMPLEMENTING LAYER 3 VIRTUAL PRIVATE NETWORK AND DEVICE

(71) Applicant: Huawei Technologies Co., Ltd., Shenzhen (CN)

(72) Inventors: Xiaohu Xu, Beijing (CN); Dacheng Zhang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 183 days.

(21) Appl. No.: 15/078,422

(22) Filed: Mar. 23, 2016

(65) Prior Publication Data

US 2016/0205020 A1    Jul. 14, 2016

Related U.S. Application Data

(63) Continuation of application No. PCT/CN2014/085896, filed on Sep. 4, 2014.

(30) Foreign Application Priority Data

Sep. 23, 2013   (CN) .......................... 2013 1 0437112

(51) Int. Cl.
*H04L 12/741* (2013.01)
*H04L 12/46* (2006.01)
(Continued)

(52) U.S. Cl.
CPC ........ *H04L 45/745* (2013.01); *H04L 12/4641* (2013.01); *H04L 12/4675* (2013.01);
(Continued)

(58) Field of Classification Search
CPC .......... H04L 45/00; H04L 12/00; H04L 61/00
See application file for complete search history.

(56) References Cited

U.S. PATENT DOCUMENTS 8,675,488 B1 *   3/2014   Sidebottom ........... H04L 67/141
                                                    370/229
2005/0190757 A1   9/2005   Sajassi
(Continued)

FOREIGN PATENT DOCUMENTS

CN    101072238 A    11/2007
CN    101552727 A    10/2009
(Continued)

OTHER PUBLICATIONS

Zhang, J., et al.,"Application and Implementation of Virtual Private Network (VPN)", Journal of Zhangzhou Vocational University, vol. 2, 2003, 6 pages.
(Continued)

*Primary Examiner* — Andrew Lai
*Assistant Examiner* — Sumitra Ganguly
(74) *Attorney, Agent, or Firm* — Slater Matsil, LLP

(57) ABSTRACT

This application provides a method for implementing a Layer 3 virtual private network (L3VPN) and an apparatus. The method includes receiving, by a first PE, an attachment notification packet sent by a first terminal device, a first site attaches to an L3VPN by using the first PE; a second site attaches to the L3VPN by using a second PE, and a first terminal device attaches to a second site before attaching to the first site. The method also includes obtaining, by the first PE, an IP address of a second terminal device, and the second terminal device attaches to the second Site; and sending, by the first PE, a binding update notification packet to the first terminal device, where the binding update notification packet carries a MAC address of the first PE and the IP address of the second terminal device.

20 Claims, 4 Drawing Sheets

(51) Int. Cl.
     *H04L 29/12*     (2006.01)
     *H04L 12/715*    (2013.01)

(52) U.S. Cl.
     CPC .......... *H04L 45/04* (2013.01); *H04L 61/2007* (2013.01); *H04L 61/6022* (2013.01)

(56) References Cited

U.S. PATENT DOCUMENTS

| | | | |
|---|---|---|---|
| 2008/0072285 A1* | 3/2008 | Sankaran | H04L 63/0892 726/2 |
| 2009/0052410 A1* | 2/2009 | Yoshida | H04L 29/12349 370/338 |
| 2012/0327811 A1* | 12/2012 | Nozaki | H04L 12/462 370/255 |
| 2013/0100851 A1 | 4/2013 | Bacthu et al. | |

FOREIGN PATENT DOCUMENTS

| | | | |
|---|---|---|---|
| CN | 101616082 A | 12/2009 | |
| CN | 101827023 A | 9/2010 | |
| CN | 101848161 A | 9/2010 | |
| CN | 102449964 A | 5/2012 | |
| EP | 2720415 A1 | 4/2014 | |

OTHER PUBLICATIONS

Wang, P.-C., et al.,"MAC Address Translation for Enabling Scalable Virtual Private LAN Services," 21st International Conference on Advanced Information Networking and Applications Workshops (AINAW '07), 6 pages.

* cited by examiner

METHOD FOR IMPLEMENTING LAYER 3 VIRTUAL PRIVATE NETWORK AND DEVICE

This application is a continuation of International Application No. PCT/CN2014/085896, filed on Sep. 4, 2014, which claims priority to Chinese Patent Application No. CN201310437112.9, filed on Sep. 23, 2013, both of which are hereby incorporated by reference in their entireties.

TECHNICAL FIELD

The present application relates to communications technologies, and in particular, to a method for implementing a Layer 3 virtual private network and a device.

BACKGROUND

A service provider (SP) may use an Internet Protocol backbone (IP backbone) network to provide a virtual private network (VPN) for a user. A Layer 3 virtual private network (L3VPN) enables a host and a router to connect to each other based on a layer 3 address. The L3VPN may be a Border Gateway Protocol (BGP) VPN or a Multiprotocol Label Switching (MPLS) VPN.

A terminal device sends an Address Resolution Protocol (ARP) request to a provider edge (PE) device that is connected to the terminal device, so as to query a Media Access Control (MAC) address corresponding to an IP address of a remote terminal device in a same local area network. The PE receiving the ARP request returns a MAC address of the PE to the terminal device that sends the ARP request. The PE outward broadcasts, by using the BGP, host route information that is corresponding to a local terminal device and is in an ARP table. For example, the terminal device may be at least one of devices, such as a mobile phone, a personal computer (PC), an IP television (IPTV), and a tablet computer.

A VPN site (hereinafter referred to as site) is a location of a VPN user, and connects to an SP network by using a customer edge-provider edge link (CE-PE link). A site may be attached to at least one VPN. For example, a site 1 and a site 2 are attached to a same L3VPN. When a terminal device 1 in the site 2 accesses a terminal device 2 in site 2, a MAC address of the terminal device 2 is used as a destination MAC address.

When the terminal device 1 migrates from the site 2 to the site 1, the MAC address of the terminal device 2 may still be saved in an ARP table of the terminal device 1. When the terminal device 1 accesses the terminal device 2, the MAC address of the terminal device 2 is still used as a destination MAC address of a packet, which causes that the terminal device 1 cannot access the terminal device 2.

SUMMARY

Embodiments of the present application provide a method for implementing an L3VPN and a device.

According to a first aspect, a network device is provided. The network device is a first PE and is applied to an L3VPN, a first site and a second site attach to a same L3VPN, the first site attaches to the L3VPN by using the first PE. The first PE includes a sending and receiving unit and a processing unit. The sending and receiving unit is configured to receive an attachment notification packet sent by a first terminal device, where the attachment notification packet carries an IP address of the first terminal device, and the attachment notification packet is used to notify the first PE that the first terminal device attaches to the first site; the processing unit is configured to obtain an IP address of a second PE according to a virtual private network identifier (VPN ID) and the IP address of the first terminal device. The second site attaches to the L3VPN by using the second PE, the first terminal device connects to the second site before attaching to the first site, and the VPN ID identifies a VPN associated with an interface receiving the attachment notification packet. The processing unit is further configured to obtain an IP address of a second terminal device according to the VPN ID and the IP address of the second PE, where the IP address of the second terminal device is different from the IP address of the first terminal device, and the second terminal device attaches to the second site. The sending and receiving unit is further configured to send a binding update notification packet to the first terminal device, where the binding update notification packet carries a MAC address of the first PE and the IP address of the second terminal device.

According to the first aspect, a first implementation manner is provided, where the processing unit includes a first determining module and a second determining module. The first determining module is configured to obtain the IP address of the second PE by querying a routing table according to the VPN ID and the IP address of the first terminal device. The second determining module is configured to obtain the IP address of the second terminal device by querying the routing table according to the VPN ID and the IP address of the second PE.

According to the first aspect, a second implementation manner is provided, where the sending and receiving unit is further configured to receive a routing withdraw message sent by the second PE, where the routing withdraw message carries an IP address prefix, VPN information, and the IP address of the second PE, the routing withdraw message is used to withdraw a host route corresponding to the IP address prefix, and the VPN information is used to identify a VPN to which the host route belongs. The processing unit includes: a third determining module, configured to determine whether the IP address of the first terminal device that is carried in the attachment notification packet is corresponding to the IP address prefix carried in the routing withdraw message, and whether the VPN ID is corresponding to the VPN identified by the VPN information; and when the IP address of the first terminal device that is carried in the attachment notification packet is corresponding to the IP address prefix carried in the routing withdraw message, and the VPN ID is corresponding to the VPN identified by the VPN information, obtain the IP address of the second PE that is carried in the routing withdraw message; and a fourth determining module, configured to obtain the IP address of the second terminal device by querying a routing table according to the VPN ID and the obtained IP address of the second PE.

According to the first or the second implementation manner of the first aspect, a third implementation manner is provided, where the network device further includes a storage unit, configured to store the routing table.

According to the first aspect or any one of the foregoing implementation manners of the first aspect, a fourth implementation manner is provided, where the binding update notification packet is an ARP packet, a MAC address of a sender of the binding update notification packet is the MAC address of the first PE, and an IP address of the sender of the binding update notification packet is the IP address of the second terminal device; or, the binding update notification packet is a neighbor advertisement (NA) message, a source MAC address of the binding update notification packet is the MAC address of the first PE, and a source IP address of the binding update notification packet is the IP address of the second terminal device.

According to the first aspect or any one of the foregoing implementation manners of the first aspect, a fifth implementation manner is provided, where the attachment notification packet is a gratuitous ARP packet, an IP address of a sender of and a target IP address of the attachment notification packet both are the IP address of the first terminal device, a MAC address of the sender of the attachment notification packet is a MAC address of the first terminal device, and a destination MAC address of the attachment notification packet is a broadcast address; or, the attachment notification packet is an unsolicited neighbor advertisement message, a source IP address of the attachment notification packet is the IP address of the first terminal device, a source MAC address of the attachment notification packet is the MAC address of the first terminal device, a destination IP address of the attachment notification packet is an all-nodes multicast address, and a target address carried in the attachment notification packet is the IP address of the first terminal device.

According to a second aspect, a method for implementing an L3VPN is provided. The method includes receiving, by a first PE, an attachment notification packet sent by a first terminal device, where the attachment notification packet carries an IP address of the first terminal device, the attachment notification packet is used to notify the first PE that the first terminal device attaches to a first site, the first site and a second site attach to a same L3VPN, and the first site connects to the L3VPN by using the first PE. The method also includes obtaining, by the first PE, an IP address of a second PE according to the IP address of the first terminal device and an ID of a VPN associated with an interface receiving the attachment notification packet, where the second site attaches to the L3VPN by using the second PE, and the first terminal device attaches to the second site before attaching to the first site. The method also includes obtaining, by the first PE, an IP address of a second terminal device according to the IP address of the second PE and the ID of the VPN associated with the interface receiving the attachment notification packet, where the IP address of the second terminal device is different from the IP address of the first terminal device, and the second terminal device attaches to the second Site. The method also includes sending, by the first PE, a binding update notification packet to the first terminal device, where the binding update notification packet carries a MAC address of the first PE and the IP address of the second terminal device.

According to the second aspect, a first implementation manner is provided, where the obtaining, by the first PE, an IP address of a second PE according to the IP address of the first terminal device and an ID of a VPN associated with an interface receiving the attachment notification packet includes: obtaining, by the first PE, the IP address of the second PE by querying a routing table according to the VPN ID and the IP address of the first terminal device; and the obtaining, by the first PE, an IP address of a second terminal device according to the IP address of the second PE and the ID of the VPN associated with the interface receiving the attachment notification packet includes: obtaining, by the first PE, the IP address of the second terminal device by querying the routing table according to the VPN ID and the IP address of the second PE.

According to the second aspect, a second implementation manner is provided, where the method further includes: receiving, by the first PE, a routing withdraw message sent by the second PE, where the routing withdraw message carries an IP address prefix, VPN information, and the IP address of the second PE, the routing withdraw message is used to withdraw a host route corresponding to the IP address prefix, and the VPN information is used to identify a VPN to which the host route belongs; the obtaining, by the first PE, an IP address of a second PE according to the IP address of the first terminal device and an ID of a VPN associated with an interface receiving the attachment notification packet includes: determining, by the first PE, whether the IP address of the first terminal device that is carried in the attachment notification packet is corresponding to the IP address prefix carried in the routing withdraw message, and whether the VPN ID is corresponding to the VPN identified by the VPN information, and when the IP address of the first terminal device that is carried in the attachment notification packet is corresponding to the IP address prefix carried in the routing withdraw message, and the VPN ID is corresponding to the VPN identified by the VPN information, obtaining the IP address of the second PE that is carried in the routing withdraw message; and the obtaining, by the first PE, an IP address of a second terminal device according to the IP address of the second PE and the ID of the VPN associated with the interface receiving the attachment notification packet includes: obtaining, by the first PE, the IP address of the second terminal device by querying a routing table according to the VPN ID and the IP address of the second PE.

According to the second aspect or any one of the foregoing implementation manners of the second aspect, a third implementation manner is provided, where the binding update notification packet is an ARP packet, a MAC address of a sender of the binding update notification packet is the MAC address of the first PE, and an IP address of the sender of the binding update notification packet is the IP address of the second terminal device; or, the binding update notification packet is an NA message, a source MAC address of the binding update notification packet is the MAC address of the first PE, and a source IP address of the binding update notification packet is the IP address of the second terminal device.

According to the second aspect or any one of the foregoing implementation manners of the second aspect, a fourth implementation manner is provided, where the attachment notification packet is a gratuitous ARP packet, an IP address of a sender of and a target IP address of the attachment notification packet both are the IP address of the first terminal device, a MAC address of the sender of the attachment notification packet is a MAC address of the first terminal device, and a destination MAC address of the attachment notification packet is a broadcast address; or, the attachment notification packet is an unsolicited neighbor advertisement (NA) message, a source IP address of the attachment notification packet is the IP address of the first terminal device, a source MAC address of the attachment notification packet is a MAC address of the first terminal device, a destination IP address of the attachment notification packet is an all-nodes multicast address, and a target address carried in the attachment notification packet is the IP address of the first terminal device.

According to the second aspect or any one of the foregoing implementation manners of the second aspect, a fifth implementation manner is provided, where the method further includes: saving, by the first PE, a correspondence between the MAC address of the first terminal device and the IP address of the first terminal device, where the attachment notification packet further carries the MAC address of the first terminal device.

According to a third aspect, a device is provided. The device is a first terminal device, including a sending and receiving unit, a processing unit, and a storage unit. The sending and receiving unit is configured to send an attachment notification packet to a PE, where the attachment notification packet carries an IP address of the first terminal device, the attachment notification packet is used to notify the PE that the first terminal device attaches to a first site, the first site and a second site attach to a same L3VPN, and the first site attaches to the L3VPN by using the PE. The sending and receiving unit is further configured to receive a binding update notification packet sent by the PE, where the binding update notification packet carries a MAC address of the PE and an IP address of a second terminal device, the IP address of the second terminal device is different from the IP address of the first terminal device, and the second terminal device attaches to the second site; the processing unit is configured to trigger the storage unit to store a correspondence between the MAC address of the PE and the IP address of the second terminal device. The storage unit is configured to store the correspondence between the MAC address of the PE and the IP address of the second terminal device.

According to the third aspect, a first implementation manner is provided, where the attachment notification packet is a gratuitous ARP packet, an IP address of a sender of and a target IP address of the attachment notification packet both are the IP address of the first terminal device, a MAC address of the sender of the attachment notification packet is a MAC address of the first terminal device, and a destination MAC address of the attachment notification packet is a broadcast address; or, the attachment notification packet is an unsolicited neighbor advertisement message, a source IP address of the attachment notification packet is the IP address of the first terminal device, a source MAC address of the attachment notification packet is a MAC address of the first terminal device, a destination IP address of the attachment notification packet is an all-nodes multicast address, and a target address carried in the attachment notification packet is the IP address of the first terminal device.

According to a fourth aspect, a method for implementing an L3VPN is provided. The method includes: sending, by a first terminal device, an attachment notification packet to a PE, where the attachment notification packet carries an IP address of the first terminal device, the attachment notification packet is used to notify the PE that the first terminal device attaches to a first site, the first site and a second site attach to a same L3VPN, and the first site attaches to the L3VPN by using the PE. The method also includes receiving, by the first terminal device, a binding update notification packet sent by the PE, where the binding update notification packet carries a MAC address of the PE and an IP address of a second terminal device, the IP address of the second terminal device is different from the IP address of the first terminal device, and the second terminal device attaches to the second site; and storing, by the first terminal device, a correspondence between the MAC address of the PE and the IP address of the second terminal device.

According to the fourth aspect, a first implementation manner is provided, where the attachment notification packet is a gratuitous ARP packet, an IP address of a sender of and a target IP address of the attachment notification packet both are the IP address of the first terminal device, a MAC address of the sender of the attachment notification packet is a MAC address of the first terminal device, and a destination MAC address of the attachment notification packet is a broadcast address; or, the attachment notification packet is an unsolicited neighbor advertisement message, a source IP address of the attachment notification packet is the IP address of the first terminal device, a source MAC address of the attachment notification packet is a MAC address of the first terminal device, a destination IP address of the attachment notification packet is an all-nodes multicast address, and a target address carried in the attachment notification packet is the IP address of the first terminal device.

In the foregoing technical solutions, when migrating from a second site to a first site, a first terminal device sends an attachment notification packet to a first PE that is connected to the first terminal device. The first PE receives the attachment notification packet and obtains an IP address of a second terminal device on the second site. The first PE sends a binding update notification packet to the first terminal device. The first terminal device stores a correspondence between a MAC address of the first PE and the IP address of the second terminal device according to the binding update notification packet. Therefore, after migrating from the second site to the first site, the first terminal device may use the MAC address of the first PE to communicate with the second terminal device on the second site, thereby helping resolve a problem in the prior art that a terminal device cannot communicate because of migration of the terminal device.

DETAILED DESCRIPTION OF ILLUSTRATIVE EMBODIMENTS

To make the objectives, technical solutions, and advantages of the present application clearer, the following clearly describes the technical solutions of the present application with reference to the accompanying drawings and the embodiments. Apparently, the following described embodiments are a part of the embodiments of the present application. Based on the embodiments of the present application, a person of ordinary skill in the art can obtain other embodiments that can solve the technical problem of the present application and implement the technical effect of the present application by equivalently altering some or all the technical features even without creative efforts. Apparently, the embodiments obtained by means of alteration do not depart from the scope disclosed in the present application.

Figure 1:
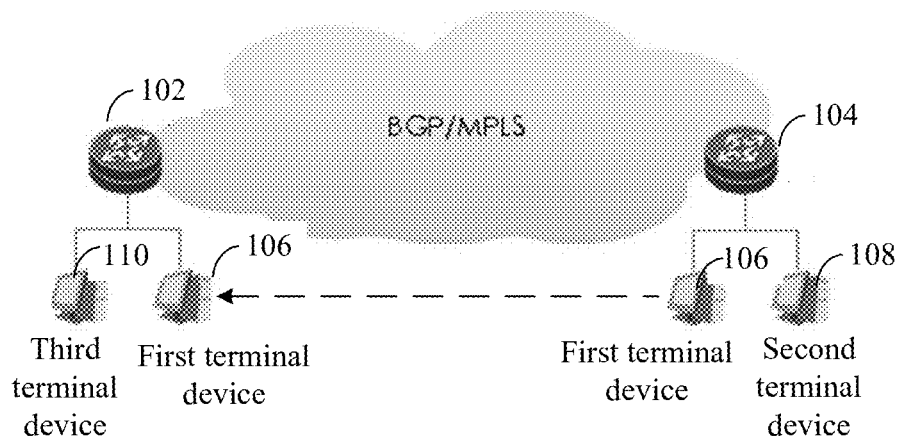
FIG. 1 is an application scenario diagram of an embodiment of the present application.

FIG. 1 is an application scenario diagram of an embodiment of the present application. As shown in FIG. 1, a third terminal device 110 attaches to a first site, and the first site attaches to a Layer 3 virtual private network (L3VPN) by using a first PE 102. A second terminal device 108 attaches to a second site. The second site attaches to the L3VPN by using a second PE 104. In other words, the first site and the second site attach to a same L3VPN. As shown in FIG. 1, a first terminal device 106 migrates from the second site to the first site.

Figure 2:
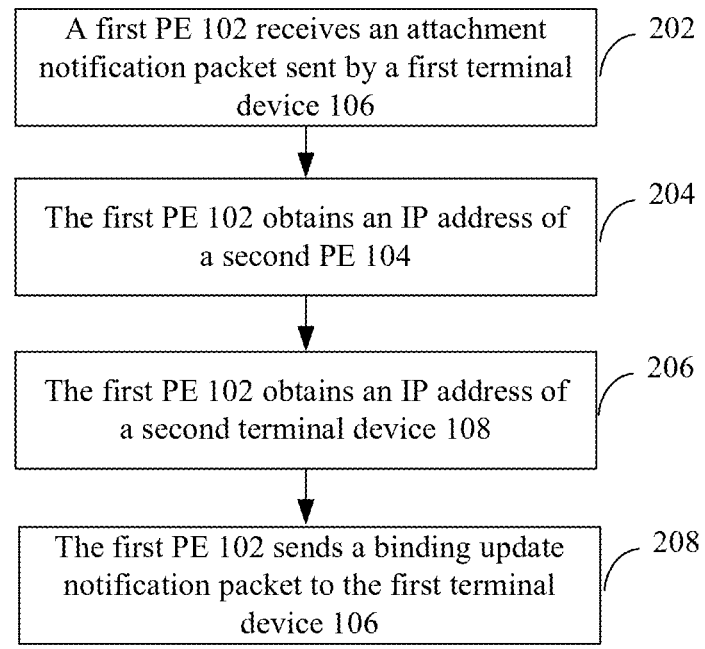
FIG. 2 is a flowchart of a method for implementing an L3VPN by a PE according to an embodiment of the present application.

Based on an application scenario of FIG. 1, FIG. 2 is a flowchart of a method for implementing an L3VPN by a PE according to an embodiment of the present application. As shown in FIG. 2, the method provided in this embodiment includes the following operations.

Step 202: The first PE 102 receives an attachment notification packet sent by the first terminal device 106, where the attachment notification packet carries an IP address of the first terminal device 106, and the attachment notification packet is used to notify the first PE that the first terminal device 106 attaches to the first site. For example, as shown in FIG. 1, when the first terminal device 106 migrates from the second site to the first site, the first terminal device 106 sends the attachment notification packet.

For example, when migrating from the second site to the first site, the first terminal device 106 may broadcast the attachment notification packet on the first site. If the first terminal device 106 supports Internet Protocol version 4 (IPv4), the attachment notification packet may be a gratuitous ARP packet, an IP address of a sender of and a target IP address of the attachment notification packet both are the IP address of the first terminal device 106, a MAC address of the sender of the attachment notification packet is a MAC address of the first terminal device 106, and a destination MAC address of the attachment notification packet is a broadcast address. If the first terminal device 106 supports Internet Protocol version 6 (IPv6), the attachment notification packet may be an unsolicited neighbor advertisement (NA) message, a source IP address of the attachment notification packet is the IP address of the first terminal device 106, a source MAC address of the attachment notification packet is a MAC address of the first terminal device 106, a destination IP address of the attachment notification packet is an all-nodes multicast address, and a target address carried in the attachment notification packet is the IP address of the first terminal device 106.

For another example, when migrating from the second site to the first site, the first terminal device 106 may send the attachment notification packet only to the first PE 102. Optionally, the attachment notification packet is an ARP packet, an IP address of a sender of the attachment notification packet is the IP address of the first terminal device 106, a MAC address of the sender of the attachment notification packet is the MAC address of the first terminal device 106, a target IP address of the attachment notification packet is an IP address of the first PE 102, and a target MAC address of the attachment notification packet is a MAC address of the first PE 102.

Step 204: The first PE 102 obtains an IP address of the second PE 104 according to a virtual private network identifier (VPN ID) and the IP address of the first terminal device 106, where the VPN ID identifies a VPN associated with an interface receiving the attachment notification packet.

The following exemplarily describes two solutions of implementing step 204.

For example, the first PE 102 may query an interface table according to an interface number of the interface receiving the attachment notification packet, so as to obtain a VPN ID that is bound to the interface receiving the attachment notification packet. The first PE 102 queries a routing table according to the VPN ID and the IP address of the first terminal device 106, and obtains the IP address of the second PE 104. The IP address of the second PE 104 is corresponding to the VPN ID and the IP address of the first terminal device 106. Optionally, the routing table may be stored on the first PE 102, or the routing table may be stored on a server. Table 1 shows an example of the interface table, and Table 2 shows an example of the routing table.

TABLE 1

Example of the interface table

| Interface number | VPN ID |
|---|---|
| 1 | vpn blue |
| 2 | vpn red |

TABLE 2

Example of the routing table

| VPN ID | IP address prefix | Next hop |
|---|---|---|
| vpn blue | IP address of a first terminal | IP address of the second PE 104 |
| vpn blue | IP address of a second terminal | IP address of the second PE 104 |

For another example, the method shown in FIG. 2 may further include: receiving, by the first PE 102, a routing withdraw message sent by the second PE 104, where the routing withdraw message carries an IP address prefix, VPN information, and the IP address of the second PE 104, and the VPN information is used to identify a VPN to which a host route belongs. For example, the VPN information may be a route target. The routing withdraw message is used to withdraw a host route corresponding to the IP address prefix. If the first PE 102 determines that the IP address of the first terminal device that is carried in the attachment notification packet is corresponding to the IP address prefix carried in the routing withdraw message, and that the VPN ID that is bound to the interface receiving the attachment notification packet is corresponding to the VPN identified by the VPN information carried in the routing withdraw message, the first PE 102 obtains the IP address of the second PE 104 that is carried in the routing withdraw message.

Step 206: The first PE 102 obtains an IP address of the second terminal device 108 according to the IP address of the second PE 104 and a VPN ID that is bound to the interface receiving the attachment notification packet, where the IP address of the second terminal device 108 is different from the IP address of the first terminal device 106.

For example, the first PE 102 may query the routing table shown in Table 2 according to the IP address of the second PE 104 and the VPN ID that is bound to the interface receiving the attachment notification packet, so as to obtain the IP address of the second terminal device 108.

Step 208: The first PE 102 sends a binding update notification packet to the first terminal device 106, where the binding update notification packet carries the MAC address of the first PE 102 and the IP address of the second terminal device 108.

For example, the first PE 102 may send the binding update notification packet only to the first terminal device 106. Alternatively, the first PE 102 may broadcast the binding update notification packet on the first site. Optionally, the binding update notification packet is an ARP packet, a MAC address of a sender of the binding update notification packet is the MAC address of the first PE 102, and an IP address of the sender of the binding update notification packet is the IP address of the second terminal device 108; or the binding update notification packet is a neighbor advertisement (NA) message, a source MAC address of the binding update notification packet is the MAC address of the first PE 102, and a source IP address of the binding update notification packet is the IP address of the second terminal device 108.

Optionally, the method shown in FIG. 2 may further include: saving, by the first PE 102, a correspondence between the MAC address of the first terminal device 106 and the IP address of the first terminal device 106.

Referring to FIG. 1, when the first terminal device 106 attaches to the second site, the first terminal device 106 stores a correspondence between the IP address of the second terminal device 108 and a MAC address of the second terminal device 108. In a case in which the first terminal device 106 migrates from the second site to the first site, after receiving the binding update notification packet sent by the first PE 102, the first terminal device 106 updates the correspondence that is previously stored. In other words, the first terminal device 106 saves a correspondence between the IP address of the second terminal device 108 and the MAC address of the first PE 102.

According to the solution in this embodiment of the present application, when migrating from the second site to the first site, the first terminal device 106 sends the attachment notification packet to the first PE 102; the first PE 102 receives the attachment notification packet and obtains the IP address of the second terminal device 108 on the second site; the first PE 102 sends the binding update notification packet to the first terminal device 106; the first terminal device 106 stores the correspondence between the MAC address of the first PE 102 and the IP address of the second terminal device 108 according to the binding update notification packet. Therefore, after migrating from the second site to the first site, the first terminal device 106 may use the MAC address of the first PE 102 to communicate with the second terminal device 108 on the second site, thereby helping resolve a problem in the prior art that a terminal device cannot communicate because of migration of the terminal device.

Figure 3:
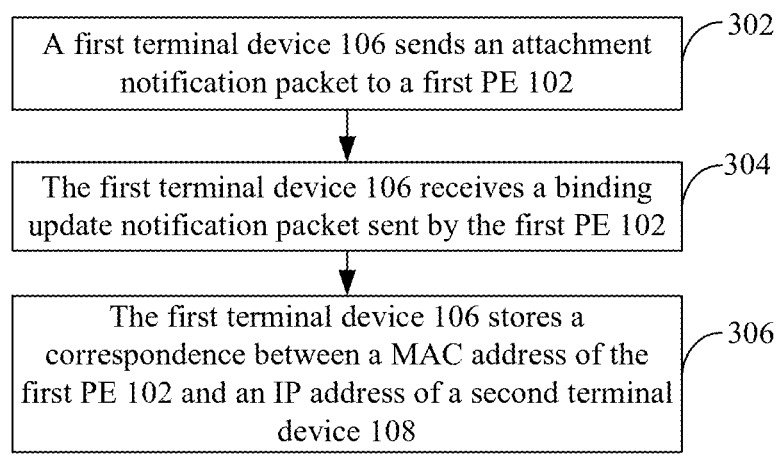
FIG. 3 is a flowchart of a method for implementing an L3VPN by a terminal device according to an embodiment of the present application.

FIG. 3 is a flowchart of a method for implementing an L3 VPN by a terminal device according to an embodiment of the present application. With reference to the scenario shown in FIG. 1, as shown in FIG. 3, the method provided in this embodiment of the present application includes: 302. When migrating from a second site to a first site, a first terminal device 106 sends an attachment notification packet to a first PE 102, where the attachment notification packet carries an IP address of the first terminal device 106, and the attachment notification packet is used to notify the first PE 102 that the first terminal device 106 attaches to the first site. Referring to FIG. 1, the first site and the second site attach to a same L3VPN, and the first site attaches to the L3VPN by using the first PE 102.

304. The first terminal device 106 receives a binding update notification packet sent by the first PE 102, where the binding update notification packet carries a MAC address of the first PE 102 and an IP address of a second terminal device 108, the IP address of the second terminal device 108 is different from the IP address of the first terminal device 106, and the second terminal device 108 attaches to the second site.

306. The first terminal device 106 stores a correspondence between the MAC address of the first PE 102 and the IP address of the second terminal device 108.

Figure 4:
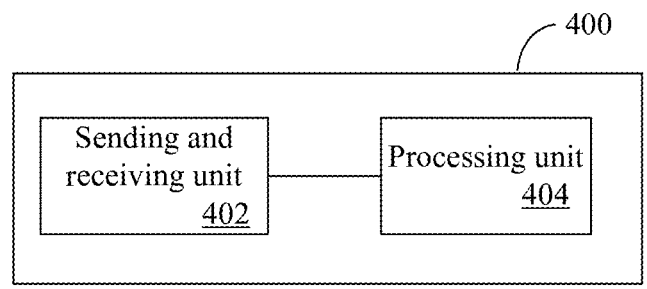
FIG. 4 is a simplified structural block diagram of a network device according to an embodiment of the present application.

FIG. 4 is a simplified structural block diagram of a network device according to an embodiment of the present application. As shown in FIG. 4, a network device 400 provided in this embodiment of the present application is a first PE. The network device 400 includes a sending and receiving unit 402 and a processing unit 404. The sending and receiving unit 402 is configured to receive an attachment notification packet sent by a first terminal device, where the attachment notification packet carries an IP address of the first terminal device, and the attachment notification packet is used to notify the first PE that the first terminal device attaches to a first site. The processing unit 404 is configured to obtain an IP address of a second PE according to the IP address of the first terminal device and a VPN ID that is bound to an interface receiving the attachment notification packet, where a second site attaches to an L3VPN by using the second PE, and the first terminal device attaches to the second site before attaching to the first site. The processing unit 404 is further configured to obtain an IP address of a second terminal device according to the IP address of the second PE and the VPN ID that is bound to the interface receiving the attachment notification packet, where the IP address of the second terminal device is different from the IP address of the first terminal device. The sending and receiving unit 402 is further configured to send a binding update notification packet to the first terminal device, where the binding update notification packet carries a MAC address of the first PE and the IP address of the second terminal device. Optionally, the network device shown in FIG. 4 may further include a storage unit that is configured to store a routing table. The processing unit 404 may query the routing table according to the IP address of the second PE and the VPN ID that is bound to the interface receiving the attachment notification packet, so as to obtain the IP address of the second terminal device.

For example, the processing unit 404 may include a first determining module and a second determining module, where the first determining module is configured to obtain the IP address of the second PE by querying the routing table according to the IP address of the first terminal device and the VPN ID that is bound to the interface receiving the attachment notification packet; and the second determining module is configured to obtain the IP address of the second terminal device by querying the routing table according to the IP address of the second PE and the VPN ID that is bound to the interface receiving the attachment notification packet.

For another example, the sending and receiving unit 402 is further configured to receive a routing withdraw message sent by the second PE, where the routing withdraw message carries an IP address prefix, VPN information, and the IP address of the second PE, the routing withdraw message is used to withdraw a host route corresponding to the IP address prefix, and the VPN information is used to identify a VPN to which the host route belongs. The processing unit 404 may include a third determining module and a fourth determining module. The third determining module is configured to: determine whether the IP address of the first terminal device that is carried in the attachment notification packet is corresponding to the IP address prefix carried in the routing withdraw message, and whether the VPN ID that is bound to the interface receiving the attachment notification packet is corresponding to the VPN identified by the VPN information carried in the routing withdraw message; and when the IP address of the first terminal device that is carried in the attachment notification packet is corresponding to the IP address prefix carried in the routing withdraw message, and the VPN ID that is bound to the interface receiving the attachment notification packet is corresponding to the VPN identified by the VPN information carried in the routing withdraw message, obtain the IP address of the second PE that is carried in the routing withdraw message. The fourth determining module is configured to obtain the IP address of the second terminal device by querying the routing table according to the IP address of the second PE and the VPN ID that is bound to the interface receiving the attachment notification packet.

Figure 5:
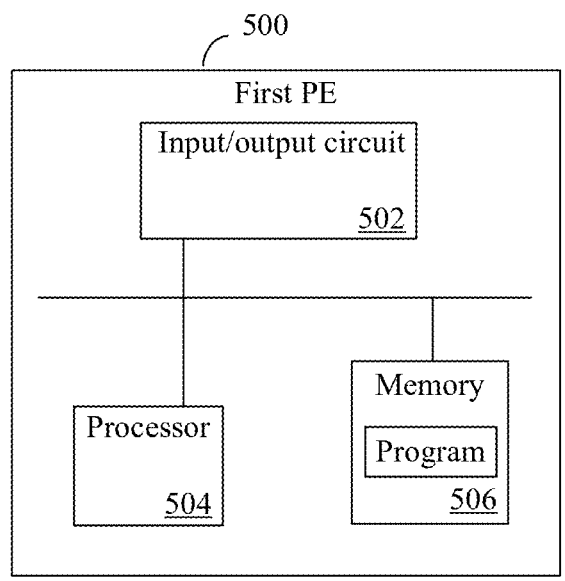
FIG. 5 is a simplified structural block diagram of hardware of a network device according to an embodiment of the present application.

FIG. 5 is a simplified structural block diagram of hardware of a network device according to an embodiment of the present application. As shown in FIG. 5, a network device 500 provided in this embodiment of the present application is a first PE. The network device 500 includes an input/output circuit 502, a processor 504, and a memory 506. The input/output circuit 502 is configured to receive an attachment notification packet sent by a first terminal device, where the attachment notification packet carries an IP address of the first terminal device, and the attachment notification packet is used to notify the first PE that the first terminal device attaches to a first site. The processor 504 is configured to obtain an IP address of a second PE according to the IP address of the first terminal device and a VPN ID that is bound to an interface receiving the attachment notification packet, where a second site attaches to an L3VPN by using the second PE, and the first terminal device attaches to the second site before attaching to the first site. The processor 504 is further configured to obtain an IP address of a second terminal device according to the IP address of the second PE and the VPN ID that is bound to the interface receiving the attachment notification packet, where the IP address of the second terminal device is different from the IP address of the first terminal device. The input/output circuit 502 is further configured to send a binding update notification packet to the first terminal device, where the binding update notification packet carries a MAC address of the first PE and the IP address of the second terminal device. The memory 506 is configured to store a program instruction, where when the program instruction is being executed, the processor 504 performs the foregoing operations. For example, the memory 506 may be one or more of various media capable of storing program, such as a read-only memory (ROM), a random access memory (RAM), a magnetic disk, or an optical disc. For example, the program may be already installed on the network device 500, or downloaded according to a requirement in a running process. For another example, the memory 506 may include a database that stores network resource information, such as a routing table.

Figure 6:
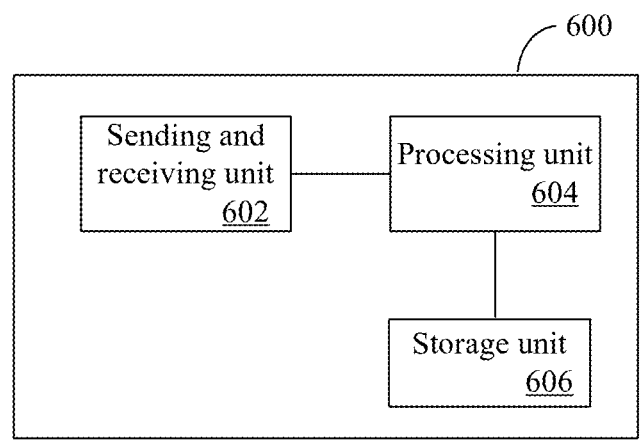
FIG. 6 is a simplified structural block diagram of a terminal device according to an embodiment of the present application.

FIG. 6 is a simplified structural block diagram of a terminal device according to an embodiment of the present application. As shown in FIG. 6, a first terminal device 600 provided in this embodiment of the present application includes a sending and receiving unit 602, a processing unit 604, and a storage unit 606. The sending and receiving unit 602 is configured to send an attachment notification packet to a PE, where the attachment notification packet carries an IP address of the first terminal device 600, and the attachment notification packet is used to notify the PE that the first terminal device 600 attaches to a first site; the first site and a second site attaches to a same L3VPN, and the first site attaches to the L3VPN by using the PE. The sending and receiving unit 602 is further configured to receive a binding update notification packet sent by the PE, where the binding update notification packet carries a MAC address of the PE and an IP address of a second terminal device, the IP address of the second terminal device is different from the IP address of the first terminal device 600, and the second terminal device attaches to the second site. The processing unit 604 is configured to trigger the storage unit 606 to store a correspondence between the MAC address of the PE and the IP address of the second terminal device; and the storage unit 606 is configured to store the correspondence between the MAC address of the PE and the IP address of the second terminal device.

Figure 7:
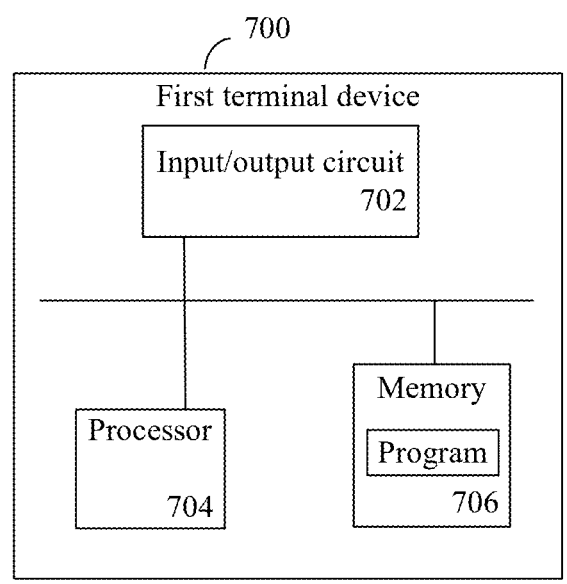
FIG. 7 is a simplified structural block diagram of hardware of a terminal device according to an embodiment of the present application.

FIG. 7 is a simplified structural block diagram of hardware of a terminal device according to an embodiment of the present application. As shown in FIG. 7, a first terminal device 700 provided in this embodiment of the present application includes an input/output circuit 702, a processor 704, and a memory 706. The input/output circuit 702 is configured to send an attachment notification packet to a PE, where the attachment notification packet carries an IP address of the first terminal device 700, and the attachment notification packet is used to notify the PE that the first terminal device 700 attaches to a first site; the first site and a second site attach to a same L3VPN, and the first site attaches to the L3VPN by using the PE. The input/output circuit 702 is further configured to receive a binding update notification packet sent by the PE, where the binding update notification packet carries a MAC address of the PE and an IP address of a second terminal device, the IP address of the second terminal device is different from the IP address of the first terminal device 700, and the second terminal device attaches to the second site. The processor 704 is configured to trigger the memory 706 to store a correspondence between the MAC address of the PE and the IP address of the second terminal device; and the memory 706 is configured to store the correspondence between the MAC address of the PE and the IP address of the second terminal device. The memory 706 is further configured to store a program instruction, where when the program instruction is being executed, the processor 704 performs the foregoing operations. For example, the memory 706 may be one or more of various media capable of storing program such as a read-only memory (ROM), a random access memory (RAM), a magnetic disk, or an optical disc. For example, the program may be already installed in the first terminal device 700, or downloaded according to a requirement in a running process.

In the description of the solutions of FIG. 1 to FIG. 7, technical details are not repeatedly described in each embodiment for brevity. Embodiments shown in FIG. 1 to FIG. 7 are correlated technical solutions that have technical details in common, and technical details of different embodiments may refer to each other.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A network device, wherein the network device is a first provider edge (PE) device in a Layer 3 virtual private network (L3VPN), a first site attaches to the L3VPN using the first PE device, and the first PE device comprises:
   a receiver, configured to receive an attachment notification packet sent by a first terminal device, wherein the attachment notification packet carries an Internet Protocol (IP) address of the first terminal device, and the attachment notification packet is used to notify the first PE device that the first terminal device attaches to the first site;
   a processor;
   a non-transitory computer-readable storage medium storing a program to be executed by the processor, the program including instructions for:
      obtaining an IP address of a second PE device according to a virtual private network identifier (VPN ID) and the IP address of the first terminal device, wherein a second site attaches to the L3VPN using the second PE device, the first terminal device attaches to the second site before attaching to the first site, and the VPN ID identifies a VPN associated with an interface receiving the attachment notification packet;
      obtaining an IP address of a second terminal device according to the VPN ID and the IP address of the second PE device, wherein the IP address of the second terminal device is different from the IP address of the first terminal device, and the second terminal device attaches to the second site; and
   a transmitter, configured to send a binding update notification packet to the first terminal device, wherein the binding update notification packet carries a Media Access Control (MAC) address of the first PE device and the IP address of the second terminal device.

2. The network device according to claim 1, wherein the program further includes instructions for:
   obtaining the IP address of the second PE device by querying a routing table according to the VPN ID and the IP address of the first terminal device; and
   obtaining the IP address of the second terminal device by querying the routing table according to the VPN ID and the IP address of the second PE device.

3. The network device according to claim 2, wherein the computer-readable storage medium is further configured to store the routing table.

4. The network device according to claim 1, wherein:
   the receiver is further configured to receive a routing withdraw message sent by the second PE device, wherein the routing withdraw message carries an IP address prefix, VPN information, and the IP address of the second PE device, the routing withdraw message is used to withdraw a host route corresponding to the IP address prefix, and the VPN information is used to identify a VPN to which the host route belongs; and
   the program further includes instructions for:
      determining whether the IP address of the first terminal device corresponds to the IP address prefix carried in the routing withdraw message, and whether the VPN ID corresponds to the VPN identified by the VPN information;
      in response to determining that the IP address of the first terminal device corresponds to the IP address prefix carried in the routing withdraw message, and the VPN ID corresponds to the VPN identified by the VPN information, obtaining the IP address of the second PE device, wherein the IP address of the second PE device is carried in the routing withdraw message; and
      obtaining the IP address of the second terminal device by querying a routing table according to the VPN ID and the obtained IP address of the second PE device.

5. The network device according to claim 1, wherein the binding update notification packet is an Address Resolution Protocol (ARP) packet, a MAC address of a sender of the binding update notification packet is the MAC address of the first PE device, and an IP address of the sender of the binding update notification packet is the IP address of the second terminal device.

6. The network device according to claim 1, wherein the binding update notification packet is a neighbor advertisement (NA) message, a source MAC address of the binding update notification packet is the MAC address of the first PE device, and a source IP address of the binding update notification packet is the IP address of the second terminal device.

7. The network device according to claim 1, wherein the attachment notification packet is a gratuitous Address Resolution Protocol (ARP) packet, an IP address of a sender of the attachment notification packet and a target IP address of the attachment notification packet both are the IP address of the first terminal device, a MAC address of the sender of the attachment notification packet is a MAC address of the first terminal device, and a destination MAC address of the attachment notification packet is a broadcast address.

8. The network device according to claim 1, wherein the attachment notification packet is an unsolicited neighbor advertisement (NA) message, a source IP address of the attachment notification packet is the IP address of the first terminal device, a source MAC address of the attachment notification packet is a MAC address of the first terminal device, a destination IP address of the attachment notification packet is an all-nodes multicast address, and a target IP address carried in the attachment notification packet is the IP address of the first terminal device.

9. A method for implementing a Layer 3 virtual private network (L3VPN), comprising:
   receiving, by a first provider edge (PE) device, an attachment notification packet sent by a first terminal device, wherein the attachment notification packet carries an Internet Protocol (IP) address of the first terminal device, the attachment notification packet is used to notify the first PE device that the first terminal device attaches to a first site, and the first site attaches to the L3VPN by using the first PE device;
   obtaining, by the first PE device, an IP address of a second PE device according to a virtual private network identifier (VPN ID) and the IP address of the first terminal device, wherein a second site attaches to the L3VPN using the second PE device, the first terminal device attaches to the second site before attaching to the first site, and the VPN ID identifies a VPN associated with an interface receiving the attachment notification packet;

obtaining, by the first PE device, an IP address of a second terminal device according to the VPN ID and the IP address of the second PE device, wherein the IP address of the second terminal device is different from the IP address of the first terminal device, and the second terminal device attaches to the second site; and sending, by the first PE device, a binding update notification packet to the first terminal device, wherein the binding update notification packet carries a Media Access Control (MAC) address of the first PE device and the IP address of the second terminal device.

10. The method according to claim 9, wherein:
obtaining the IP address of the second PE device according to the VPN ID and the IP address of the first terminal device comprises:
   obtaining, by the first PE device, the IP address of the second PE device by querying a routing table according to the VPN ID and the IP address of the first terminal device; and
obtaining, by the first PE device, the IP address of the second terminal device according to the VPN ID and the IP address of the second PE device comprises:
   obtaining, by the first PE device, the IP address of the second terminal device by querying the routing table according to the VPN ID and the IP address of the second PE device.

11. The method according to claim 9, further comprising:
receiving, by the first PE device, a routing withdraw message sent by the second PE device, wherein the routing withdraw message carries an IP address prefix, VPN information, and the IP address of the second PE device, the routing withdraw message is used to withdraw a host route corresponding to the IP address prefix, and the VPN information is used to identify a VPN to which the host route belongs;

wherein obtaining, by the first PE device, the IP address of the second PE device according to the VPN ID and the IP address of the first terminal device comprises:
   determining, by the first PE device, whether the IP address of the first terminal device corresponds to the IP address prefix carried in the routing withdraw message, and whether the VPN ID corresponds to the VPN identified by the VPN information; and
   in response to determining that the IP address of the first terminal device corresponds to the IP address prefix carried in the routing withdraw message, and the VPN ID corresponds to the VPN identified by the VPN information, obtaining the IP address of the second PE device, wherein the IP address of the second PE device is carried in the routing withdraw message; and
obtaining, by the first PE device, the IP address of the second terminal device according to the VPN ID and the IP address of the second PE device comprises:
   obtaining, by the first PE device, the IP address of the second terminal device by querying a routing table according to the VPN ID and the IP address of the second PE device.

12. The method according to claim 9, wherein the binding update notification packet is an Address Resolution Protocol (ARP) packet, a MAC address of a sender of the binding update notification packet is the MAC address of the first PE device, and an IP address of the sender of the binding update notification packet is the IP address of the second terminal device.

13. The method according to claim 9, wherein the binding update notification packet is a neighbor advertisement (NA) message, a source MAC address of the binding update notification packet is the MAC address of the first PE device, and a source IP address of the binding update notification packet is the IP address of the second terminal device.

14. The method according to claim 9, wherein the attachment notification packet is a gratuitous Address Resolution Protocol (ARP) packet, an IP address of a sender of the attachment notification packet and a target IP address of the attachment notification packet both are the IP address of the first terminal device, a MAC address of the sender of the attachment notification packet is a MAC address of the first terminal device, and a destination MAC address of the attachment notification packet is a broadcast address.

15. The method according to claim 9, wherein the attachment notification packet is an unsolicited neighbor advertisement (NA) message, a source IP address of the attachment notification packet is the IP address of the first terminal device, a source MAC address of the attachment notification packet is a MAC address of the first terminal device, a destination IP address of the attachment notification packet is an all-nodes multicast address, and a target IP address carried in the attachment notification packet is the IP address of the first terminal device.

16. The method according to claim 9, further comprising:
saving, by the first PE device, a correspondence between the MAC address of the first terminal device and the IP address of the first terminal device, wherein the attachment notification packet further carries the MAC address of the first terminal device.

17. A first terminal device, comprises:
a transmitter, configured to send an attachment notification packet to a provider edge (PE) device, wherein the attachment notification packet carries an Internet Protocol (IP) address of the first terminal device, the attachment notification packet notifies the PE device that the first terminal device attaches to a first site, the first site and a second site attach to a same Layer 3 virtual private network (L3VPN), and the first site attaches to the L3VPN using the PE device;
a receiver, configured to receive a binding update notification packet sent by the PE device, wherein the binding update notification packet carries a Media Access Control (MAC) address of the PE device and an IP address of a second terminal device, the IP address of the second terminal device is different from the IP address of the first terminal device, and the second terminal device attaches to the second site;
a non-transitory computer-readable storage medium, configured to store a correspondence between the MAC address of the PE device and the IP address of the second terminal device; and
a processor, configured to trigger the computer-readable storage medium to store the correspondence between the MAC address of the PE device and the IP address of the second terminal device.

18. The first terminal device according to claim 17, wherein the attachment notification packet is a gratuitous Address Resolution Protocol (ARP) packet, an IP address of a sender of the attachment notification packet and a target IP address of the attachment notification packet both are the IP address of the first terminal device, a MAC address of the sender of the attachment notification packet is a MAC address of the first terminal device, and a destination MAC address of the attachment notification packet is a broadcast address; or the attachment notification packet is an unsolicited neighbor advertisement (NA) message, a source IP address of the attachment notification packet is the IP address of the first terminal device, a source MAC address of the attachment notification packet is a MAC address of the first terminal device, a destination IP address of the attachment notification packet is an all-nodes multicast address, and a target IP address carried in the attachment notification packet is the IP address of the first terminal device.

19. A method for implementing a Layer 3 virtual private network (L3VPN), comprising:

sending, by a first terminal device, an attachment notification packet to a provider edge (PE) device, wherein the attachment notification packet carries an Internet Protocol (IP) address of the first terminal device, the attachment notification packet is used to notify the PE device that the first terminal device attaches to a first site, the first site and a second site attach to a same Layer 3 virtual private network (L3VPN), and the first site attaches to the L3VPN by using the PE device;

receiving, by the first terminal device, a binding update notification packet sent by the PE device, wherein the binding update notification packet carries a Media Access Control (MAC) address of the PE device and an IP address of a second terminal device, the IP address of the second terminal device is different from the IP address of the first terminal device, and the second terminal device attaches to the second site; and storing, by the first terminal device, a correspondence between the MAC address of the PE device and the IP address of the second terminal device.

20. The method according to claim 19, wherein the attachment notification packet is a gratuitous Address Resolution Protocol (ARP) packet, an IP address of a sender of the attachment notification packet and a target IP address of the attachment notification packet both are the IP address of the first terminal device, a MAC address of the sender of the attachment notification packet is a MAC address of the first terminal device, and a destination MAC address of the attachment notification packet is a broadcast address; or the attachment notification packet is an unsolicited neighbor advertisement (NA) message, a source IP address of the attachment notification packet is the IP address of the first terminal device, a source MAC address of the attachment notification packet is a MAC address of the first terminal device, a destination IP address of the attachment notification packet is an all-nodes multicast address, and a target IP address carried in the attachment notification packet is the IP address of the first terminal device.

\* \* \* \* \*